US009736268B1

(12) United States Patent
Tsay et al.

(10) Patent No.: US 9,736,268 B1
(45) Date of Patent: Aug. 15, 2017

(54) SYSTEM FOR GENERATING RESPONSES TO REQUESTS

(71) Applicant: THUMBTACK, INC., San Francisco, CA (US)

(72) Inventors: Joseph Lin Tsay, San Francisco, CA (US); Alexander Cheston, San Francisco, CA (US); Weikang Wan, Foster City, CA (US); Giles Lavelle, Shrewsbury (GB); Yue Zhao, Orinda, CA (US); Togan Adrien Olczak, San Francisco, CA (US)

(73) Assignee: THUMBTACK, INC., San Francisco, CA (US)

( * ) Notice: Subject to any disclaimer, the term of this patent is extended or adjusted under 35 U.S.C. 154(b) by 0 days.

(21) Appl. No.: 15/440,986

(22) Filed: Feb. 23, 2017

(51) Int. Cl.
*H04L 29/08* (2006.01)
(52) U.S. Cl.
CPC ............ *H04L 67/327* (2013.01); *H04L 67/02* (2013.01)
(58) Field of Classification Search
CPC ....... H04L 67/327; H04L 67/02; H04L 67/42; H04L 67/06; G06F 9/45529; G06F 9/455; G06F 17/30705
USPC ......................................................... 709/205
See application file for complete search history.

(56) References Cited

U.S. PATENT DOCUMENTS 9,177,056 B2    11/2015  Zappacosta et al.
2006/0242162 A1 10/2006  Conner et al.
2013/0262567 A1* 10/2013 Walker .................. H04L 69/329
                                                   709/203
2014/0298037 A1* 10/2014 Xiao ...................... H04L 9/3273
                                                   713/181
2015/0363215 A1* 12/2015 Versteeg ............. G06F 11/3664
                                                   703/23

OTHER PUBLICATIONS

How to Write the Perfect Thumbtack Quote, Thumbtack Journal, Mar. 10, 2015, downloaded at: https://www.thumbtack.com/blog/how-to-write-the-perfect-thumbtack-quote/, 9 pages.

* cited by examiner

*Primary Examiner* — Tu Nguyen
(74) *Attorney, Agent, or Firm* — Nicholson De Vos Webster & Elliott LLP

(57) ABSTRACT

A server automatically generates a response to a request received from a first user. The server receives configuration information for configuring response templates for a second user. The configuration information indicates matching preferences, where each matching preference specifies a request field and a corresponding set of one or more expected values, and a message body that includes a set of one or more placeholder values. The response templates are generated for the second user according to the configuration information. The request is received from the first user. The second user is selected to respond to the request received from the first user. The response template that is determined to closest match to the request is automatically selected. The response is automatically generated using the selected template including populating the placeholder values with information extracted from the request. The generated response is transmitted to the first user.

21 Claims, 7 Drawing Sheets

305

| 310 | When do you want to use this template? |
|---|---|
| 312 | ○ Never for Event DJ requests |
| 314 | ○ For Event DJ requests that don't match a specific template |
| 316 | ◉ For specific Event DJ requests only |
| 318 | Which criteria should this template match? |
| 320 | Event Type |
| 322 | ☐ Birthday Party |
| 324 | ☑ Wedding |
| 326 | ☑ Corporate Event |
| 328 | ☐ Prom/School dance |
| 330 | Music Preferences |
| 332 | ☑ Pop |
| 334 | ☑ Rock |
| 336 | ☑ Hip-hop |
| 340 | Number of Guests |
| 342 | ☑ 25 or fewer |
| 344 | ☑ 26-50 |
| 346 | ☐ Over 50 |
| 350 | Extra Services |
| 352 | ☑ MC services |
| 354 | ☐ Fog machine |
| 356 | ☐ Microphones |

FIG. 3

Total Price — 415
[PRICE]

410

Hi <REQUESTER NAME>,
— 420
                                                                  — 425
My name is Joe Smith. I'd be delighted to DJ at your <SERVICE DESCRIPTION> on <SERV_DATE>. I have been in business since 2007 and have worked with many different customers.
— 430
                                                                  — 435
I see that you are mainly looking for <SERVICE DESCRIPTION DETAIL>.
                                                                  — 435
I fit well within your budget. A rough estimate for <SERVICE DESCRIPTION DETAIL> is <PRICE>.
— 415
You can call me at 555-123-4567 or reply to this message. I look forward to hearing from you!

Joe Smith

— 450
UPLOAD ATTACHMENT

| 510 | What kind of event are you hosting? |
|---|---|
| 512 | ☐ Birthday Party |
| 514 | ☑ Wedding |
| 516 | ☐ Corporate Event |
| 518 | ☐ Prom/School dance |
| 520 | How many guests do you expect |
| 522 | ☐ 25 or fewer |
| 524 | ☑ 26-50 |
| 526 | ☐ Over 50 |
| 530 | What kind of music would you like? |
| 532 | ☑ Pop |
| 534 | ☐ Rock |
| 536 | ☐ Hip-hop |
| 540 | What additional equipment or services would you like? |
| 542 | ☑ MC services |
| 544 | ☐ Fog machine |
| 546 | ☑ Microphones |
| 550 | Where do you need the DJ? |
| 552 | 94301 |

FIG. 5

SYSTEM FOR GENERATING RESPONSES TO REQUESTS

FIELD

Embodiments of the invention relate to the field of data processing; and more specifically, to an improved system for generating responses to requests.

BACKGROUND

Responses are commonly generated for responding to requests in data processing. Some responses are fully automatic and apply to all requests. For example, in the context of web servers, a request for a web page is typically responded with a response that contains the requested web page (if such a web page exists). This response is typically not customized to the individual requester.

Other types of responses are manually generated by the responder. For example, websites exist that allow potential service buyers to submit a request for a service that includes certain details of the request such as a category and a location, and the online marketplace may transmit the request to one or more service professionals that match the requested category and location, and the service professional may compose and generate a response. These responses are largely manual and can be time intensive.

SUMMARY

A server automatically generates a response to a request received from a first user. The server receives configuration information for configuring response templates for a second user. The configuration information indicates matching preferences, where each matching preference specifies a request field and a corresponding set of one or more expected values, and a message body that includes a set of one or more placeholder values. The response templates are generated for the second user according to the configuration information. The request is received from the first user. The second user is selected to respond to the request received from the first user. The response template that is determined to closest match to the request is automatically selected. The response is automatically generated using the selected template including populating the placeholder values with information extracted from the request. The generated response is transmitted to the first user.

BRIEF DESCRIPTION OF THE DRAWINGS

The invention may best be understood by referring to the following description and accompanying drawings that are used to illustrate embodiments of the invention. In the drawings:

FIG. 3 illustrates an exemplary interface for a responder to configure a set of one or more matching preferences for a template, according to an embodiment;

FIG. 4 illustrates an example interface that allows the responder to specify or edit a number of placeholder values in a template, according to an embodiment;

FIG. 5 illustrates an exemplary interface that may be provided by the server for a requester to submit a request for a DJ event service, according to an embodiment;

DESCRIPTION OF EMBODIMENTS

Figure 1:
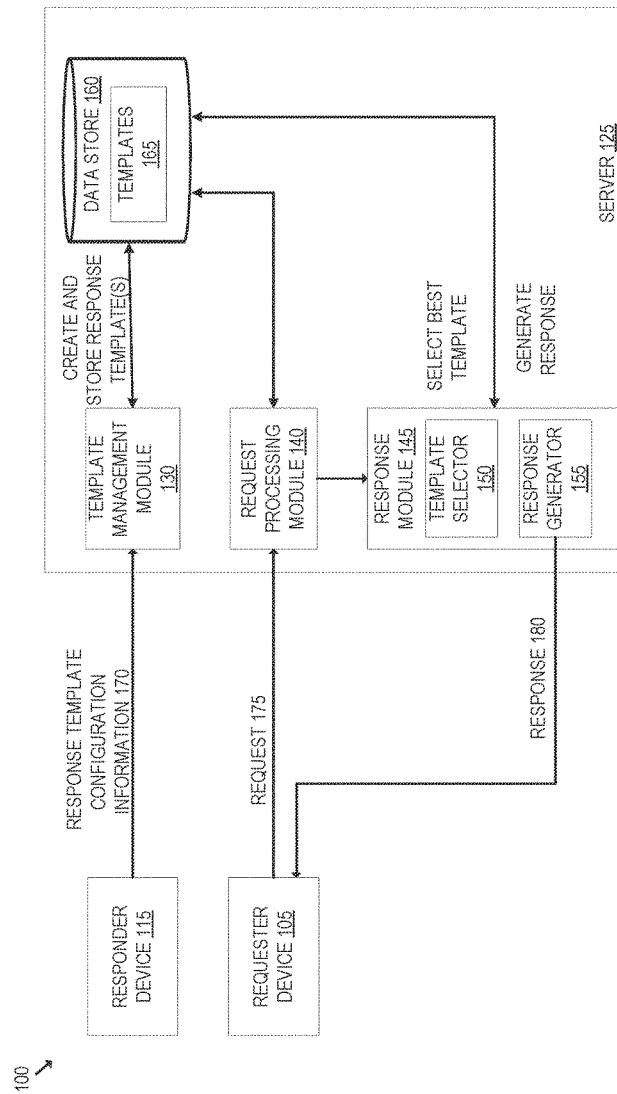
FIG. 1 is a block diagram that illustrates an exemplary architecture for an improved system for generating responses to requests, according to an embodiment.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for an improved system for generating responses to requests is described. In an embodiment, the system provides a set of tools that allow a user (sometimes referred to herein as a "responder") to create, manage, and/or configure templates for automatically responding to a request of a different user (sometimes referred herein as a "requester"). Each template may be configured with a set of one or more matching preferences that allow the system to automatically select the best template for responding to a particular request. That is, different templates may be selected for different requests (depending on the data contained in the request). Each template may be configured with a set of one or more placeholder values that are automatically populated by the system with values included in the request. A request from a requester is received that can be responded to by a set of one or more different responders. For each of these set of one or more different responders, the system automatically selects the template that is determined to be the best template for generating the response (e.g., the template that most closely matches the request) by using, for example, data from the request and the set of matching preferences of each template. Automatically selecting the best template for generating a response reduces the time and effort for responders to respond to a request. The system automatically generates a response using the selected template including automatically populating the set of placeholder values using data from the request. The system may automatically transmit the generated response to the requester, or may provide the generated response to the responder for approval before transmitting the response to the requester.

In a specific embodiment, the request is a request for service from a customer that is for a set of one or more responders; the response is provided to the customer that allows the customer to determine whether to proceed with hiring the professional. For instance, the response may include information including one or more of the following: the name of the professional, contact information of the professional (e.g., phone number, email address, social network username, etc.), a description of the qualifications of the professional, information about the price the professional estimates the requested job will cost, and other information that the professional wants to include to win the business of the customer.

FIG. 1 is a block diagram that illustrates an exemplary architecture for an improved system for generating responses to requests, according to an embodiment. The system 100 illustrated in FIG. 1 includes a requester device 105 that is operated by a requester, a responder device 115 that is operated by a responder, and a server 125. The requester device 105 and the responder device 115 each are types of computing devices that interact with the server 125 and may be a desktop, laptop, smartphone, tablet, wearable device, etc., that executes a client network application. The client network application may be a web browser (e.g., a desktop browser, a mobile optimized browser), a native application, or other application that can access network resources such as web pages, images, videos, or other computer files. The requester device 105 and the responder device 115 interact with the server 125 over a network, such as the Internet.

The server 125 is a computing device that provides functionality for the improved system for generating responses to requests. In the embodiment illustrated in FIG. 1, the server 125 includes the template management module 130, the request processing module 140, the response module 145, and the data store 160. The data store 160 stores data related to the responders including the response templates 165. The data store 160 may store data extracted from requests from requesters. The data store 160 may also store data related to the requesters. The data store 160 is used by the server 125 (e.g., the template management module 130, the request processing module 140, and/or the response module 145) when generating templates and/or when generating responses from templates. Although illustrated in FIG. 1 as part of the server 125, the data store 160 may be located in a separate computing device than the server 125 and queried by the server 125.

The template management module 130 is adapted to be used by the responders to create, manage, and/or configure templates that can be used for automatically generating a response to a request. For example, the template management module 130 may include an interface (e.g., available as a website or part of a native application) that allows responders to create, view, edit, delete, and/or configure the templates. In an embodiment, the template management module 130 may automatically create templates based on the last responses sent by the responder. In another embodiment, the template management module 130 may allow the responder to select a request and generate a template based on the request. In an embodiment, the template management module 130 may allow the responder to generate the template from scratch. It should be understood that the template management module 130 may be configured to allow the responder to create multiple templates. For instance, the responder may create a template for different types of requests, different occasions, and different price ranges. As will be described in greater detail later herein, the templates may be configured for matching the requests such that the template that best matches a request (is the most appropriate for the request) is automatically selected. The templates may be configured to include a set of one or more placeholder values that can be automatically populated when generating the response based on values provided in the requester request.

The request processing module 140 is configured to receive and process requests from requesters. Each request defines the parameters of what is being requested. In a specific embodiment where the request is a request for service, the request defines the type of service requested, the location where the service is desired, a category of the desired service, and one or more request preferences. Typically, the location indicates where the customer is located and/or how far the customer is willing to travel to purchase services. The location may be entered as a city, a street within a city, a zip code, etc. The category of service indicates the type of service that is desired. There may be many different categories that can be selected and/or input by the customer. As an example, French Lessons may be a category. As another example, Interior Design may be a category. The request may also include information about the requested job, dependent upon the job category. This information is sometimes referred herein as request preferences. For instance, if the category is Interior Design, the request may specify what room(s) (e.g., kitchen, living room, bedroom, dining room, commercial or office space, etc.) are desired to be improved. As another example, if the category is French Lessons, the request may specify the age (or age range) of the person that wants to improve or learn French. The request preferences may be the same as the matching preferences configured by the responder or may be a superset of the matching preferences.

The request processing module 140 may select the responder(s) that are eligible for responding to the request. In an embodiment, the request processing module 140 selects, from multiple responders, a set of one or more responders for responding to the request as a result of a matching process. This matching may include selecting the set of responders that match at least the requested location and category, and may be based on data analysis that indicates one or more of the following: a determined interest level of the responder in the request; a relevance of the responder to the requester; relatively short term supply and demand in the marketplace for the requested job; and relatively long term supply and demand in the marketplace. In another embodiment, instead of matching the request with a set of responders(s), the request specifies the responder(s) for responding. For instance, the server 125 may be configured to allow the requester to view/browse a list of responder(s) (e.g., that match the requested location and category) and select the responder(s) directly. In this embodiment, the request processing module 140 selects the responder based on the identified responder in the request itself.

The response module 145 is configured to select the best template of a responder to use to respond to the request. The response module 145 includes a template selector 150 that may perform a matching process to determine the best template to select for generating a response for the request. The matching process may include comparing information included in the request against each of the templates for the responder stored in the response templates 165 and determining which template best matches the information in the request. The response module 145 includes a response generator 155 that is used to automatically generate a response based on the request and the selected template. For instance, the response generator 155 automatically populates a set of one or more placeholder values in the template with values provided in the requester request. For instance, in a specific embodiment where the request is a request for service, the placeholder values may include the requester name, the day of the week the service is requested, the date of the requested service, the type of service, and/or a description of the service. The response module 145 is also configured to communicate the generated response to the requesting device.

Figure 2:
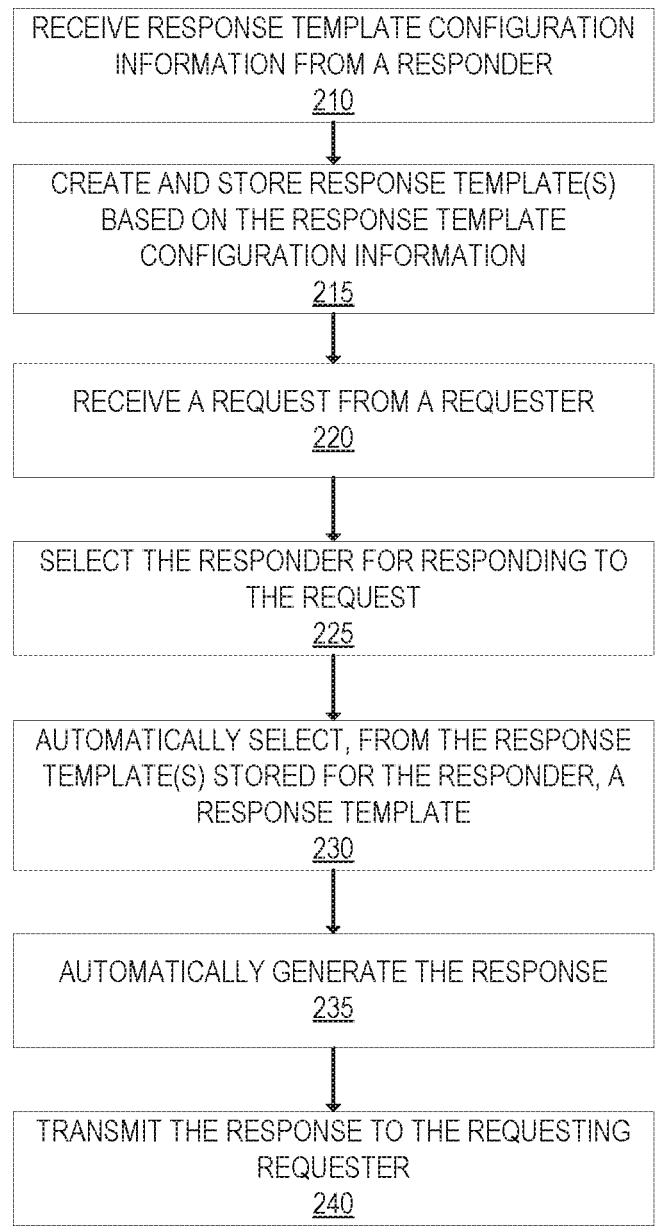
FIG. 2 is a flow diagram that illustrates exemplary operations for an improved system for generating responses to requests, according to an embodiment.

FIG. 2 is a flow diagram that illustrates exemplary operations for an improved system for generating responses to requests, according to an embodiment. The operations of FIG. 2 and the other flow diagrams will be described with respect to the exemplary embodiment of FIG. 1. However, it should be understood that the operations of FIG. 2 and the other flow diagrams can be performed by different embodiments than those discussed with FIG. 1, and the exemplary embodiment of FIG. 1 can perform different embodiments than those discussed with respect to FIG. 2 and the other flow diagrams.

At operation 210, the template management module 130 receives, from the responder device 115, response template configuration information 170. The response template configuration information 170 is used by the template management module 130 when creating, managing, and/or configuring the templates that are customized to the responder for generating a response to a request. The response template configuration information 170 defines the parameters of the template. The response template configuration information 170 may specify, for each template, a message field and/or attachment(s). The message field of the response template may be customized by the responder. For instance, in an embodiment where the template is used by a professional for responding to a request for service, the template may include information including one or more of the following: the name of the professional, contact information of the professional (e.g., phone number, email address, social network username, etc.), a description of the qualifications of the professional, information about the price the professional estimates the requested job will cost, and other information that the professional wants to include to win the business of the customer.

The response template configuration information 170 may specify a set of one or more matching preferences for each template. A matching preference is used by the response module 145 when selecting a template to use to respond to a request. In an embodiment, a matching preference includes a request field and corresponding a set of one or more expected values for matching. The request field of a matching preference is based on the request field used by the requester when submitting the request. By way of example, for a request for the services of a DJ for an event, the request may include a request field for the type of event (e.g. birthday party, wedding, corporate event, prom/school dance) and the set of one or more expected values used for matching. For instance, a DJ professional may configure a template for weddings, a separate template for birthday parties, and a separate template for other types of events. In the template for weddings, the matching preference may be: {event_type, wedding}; for the template for birthday parties, the matching preference may be: {event_type, birthday party}; and for the template for other events, the matching preference may be: {event_type, (corporate event, prom/school dance)}.

FIG. 3 illustrates an exemplary interface for a responder to configure a set of one or more matching preferences for a template, according to an embodiment. Although not illustrated in FIG. 3, the interface 305 is specific for an event DJ template and may be provided by the template management module 130 in response to the responder specifying to configure or create an event DJ template. It should be understood that the predefined request fields and corresponding input value options for matching provided in the interface 305 are exemplary and different request fields and input value options may be used. The interface 305 includes a number of request fields that are used to match against a request, in this example a request for services of a DJ for an event. The interface 305 includes a field 310 for defining when this template is to be used, and a corresponding set of input value options 312-314 (respectively, never for event DJ requests, for event DJ requests that don't match a specific template, and for specific event DJ requests only). In the example shown in FIG. 3, the input value 316 representing that the template is to be used for specific event DJ requests only, has been selected. The interface 305 includes a set of one or more request fields 318 that define the criteria upon which the template is to match against a request. The request field 320 is for specifying the type of event this template is to match by selecting one or more of the corresponding input value options 322-328 (respectively birthday party, wedding, corporate event, and prom/school dance). In the example of FIG. 3, the input values 324 and 326 have been selected, representing a wedding and corporate event respectively. The request field 330 is for specifying the music preferences this template is to match by selecting one or more of the corresponding input value options 332-336 (respectively pop, rock, and hip-op). In the example of FIG. 3, the input values 332-336 have each been selected, meaning that this template matches against all types of music preferences. The request field 340 is for specifying the number of guests this template is to match by selecting one or more of the corresponding input value options 342-346 (respectively 25 or fewer, 26-50, and over 50). In the example of FIG. 3, the input values 342 and 344 have been selected, representing 25 or fewer guests and 26-50 guests. The request field 350 is for specifying the extra services this template is to match by selecting one or more of the corresponding input value options 352-356 (respectively MC services, fog machine, and microphones). In the example of FIG. 3, the input value 352 has been selected, representing MC services.

The template management module 130 may allow the responder to specify or edit a number of placeholder values in the message field that are automatically populated based on information in the request (if that template is used for generating a response). For instance, in a specific embodiment where the request is a request for service, example placeholder values include the requester name, the day of week, the date the job is requested, the type of service, and a description of the service. The location of the placeholder values in the message field may be configured by the responder. FIG. 4 illustrates an example interface that allows the responder to specify or edit a number of placeholder values in a template, according to an embodiment. FIG. 4 illustrates a template that is used for responding to a request for service. The interface 410 may be provided by the template management module 130 in an editor (e.g., a what you see is what you get (WYSIWYG) type editor). The available placeholder fields may be inserted into the message body of the template (e.g., drag and drop from a sidebar listing the available placeholder fields). As shown in FIG. 4, the placeholder fields inserted into the template include the requester name field 420, the service description field 425, the service date field 430, and the service description detail field 435. The interface 410 also allows the professional to specify the total price 415 to be used for the template, and includes an attachment upload button 450 to allow the professional to include any attachment.

In an embodiment, a template may be created automatically by the template management module 130 based on a previous request and/or submitted response of the responder. For example, the template management module 130 may analyze requests sent to the responder in which the responder submits a response (e.g., over a threshold value) and automatically generate a template that matches those requests. As another example, the template management module 130 may receive from the responder a selection of a previous response and automatically generate a template that matches similar requests in the future. In such an embodiment, automatically generating the template includes automatically setting the one or more matching preferences for the template according to the request values submitted by the requester. For example, with reference to FIG. 3, if the request indicates that the type of event for the DJ is a wedding, then automatically setting the one or more matching preferences for the template includes setting the value of the request field 320 to correspond to a wedding event.

Next, at operation 215, the template management module 130 creates and stores one or more templates based on the response template configuration information received in operation 210. It should be understood that the template management module 130 may be configured to allow the responder to create multiple templates. For instance, the responder may create a template for different types of requests, different occasions, and different price ranges.

Next, at operation 220, the request processing module 140 of the server 125 receives the request 175 from the requester device 105. The request 175 defines the parameters of what is being requested including a set of one or more request preferences. In a specific embodiment where the request is a request for service, the request defines the type of service requested, the location where the service is desired, a category of the desired service, and one or more request preferences.

FIG. 5 illustrates an exemplary interface that may be provided by the server 125 for a requester to submit a request for a DJ event service, according to an embodiment. The customer may have indicated that they need a DJ event service and the interface 505 may be presented to the user. It should be understood that the predefined request fields and corresponding input value options provided by the interface 505 are exemplary and different request fields and input value options may be used. The interface 505 includes a number of request fields for the customer to define details of the requested service. The interface 505 includes a request field 510 for the kind of event that the customer is hosting, and a corresponding set of input value options 512-518 for the customer to specify the kind of event (respectively birthday party, wedding, corporate event, and prom/school dance). In the example shown in FIG. 5, the input value 514 representing a wedding event has been selected. The interface 505 includes a request field 520 for specifying how many guests are expected at the event, and a corresponding set of input value options 522-526 for the customer to specify the kind of event (respectively 25 or fewer, 26-50, and over 50 guests). In the example shown in FIG. 5, the input value 524 representing 26-50 guests has been selected. The interface 505 includes a request field 530 for specifying the type of music desired, and a corresponding set of input value options 532-536 for the customer to specify the type of music (respectively pop, rock, and hip-hop). In the example shown in FIG. 5, the input value 532 representing pop music has been selected. The interface 505 includes a request field 540 for specifying additional equipment or services for the event, and a corresponding set of input value options 542-546 for the customer to specify the additional equipment or services (respectively MC services, fog machine, and microphones). In the example shown in FIG. 5, the input value 542 and the input value 546 respectively representing MC services and microphones have been selected. The interface 505 includes a location field 550 for specifying where the DJ is needed, and a corresponding input value field 552 that allows the customer to specify the location.

Referring back to FIG. 2, at operation 225, the request processing module 140 selects the responder for responding to the request. In an embodiment, the request processing module 140 selects the responder for responding to the request using a matching process that selects the responder (and potentially a set of one or more other responders) for responding to the request. This matching process may include determining that the responder matches one or more parameters specified in the request. In a specific embodiment where the request is a request for service, this matching may include selecting the set of responders that match at least the requested location and category, and may be based on data analysis that indicates one or more of the following: a determined interest level of the professional in the request; a relevance of the professional to the customer; relatively short term supply and demand in the marketplace for the requested job; and relatively long term supply and demand in the marketplace. In another embodiment, instead of matching the request with a set of responder(s), the request itself specifies the responder(s). For instance, the server may be configured to allow the requester to view/browse a list of responder(s) (e.g., that match the requested location and category) and select the responder(s) directly. In this embodiment, the request processing module 140 selects the responder based on the identified responder in the request itself.

Next, at operation 230, the template selector 150 of the response module 145 automatically selects, from the response template(s) 165 for the responder stored in the data store 160, a response template. The template selector 150 may perform a matching process to determine the best template to select for generating a response to the request 175. The matching process may include comparing information included in the request 175 against each of the templates for the responder stored in the response template(s) 165 and determining which template best matches the information in the request. Determining which template best matches the information in the request may include performing a scoring process where each of the response templates are scored based at least on the comparison of the request values included in the request with the expected values of the matching preference configured for that template. The scoring process may incorporate historical analysis of the templates (for similar requests in the same category, for example) that reflects how each template performs. Example historical analysis may include: the rate at which requesters view a response generated from that template, the rate at which requesters respond to a response generated from that template, and/or the rate at which requesters select a responder to fulfill the request as a result of a response generate from that template. The template that has the highest score may be the template that is automatically selected. Automatically selecting the best template for generating a response reduces the time and effort for responders to respond to a request.

In an embodiment, the template selector 150 may highlight or flag any information from the request that does not match the selected template. By way of example, if the request specifies use of a fog machine and the responder does not have access to a fog machine, the template selector may flag that to the responder that a fog machine was requested so that the responder may customize their response accordingly.

Figure 6:
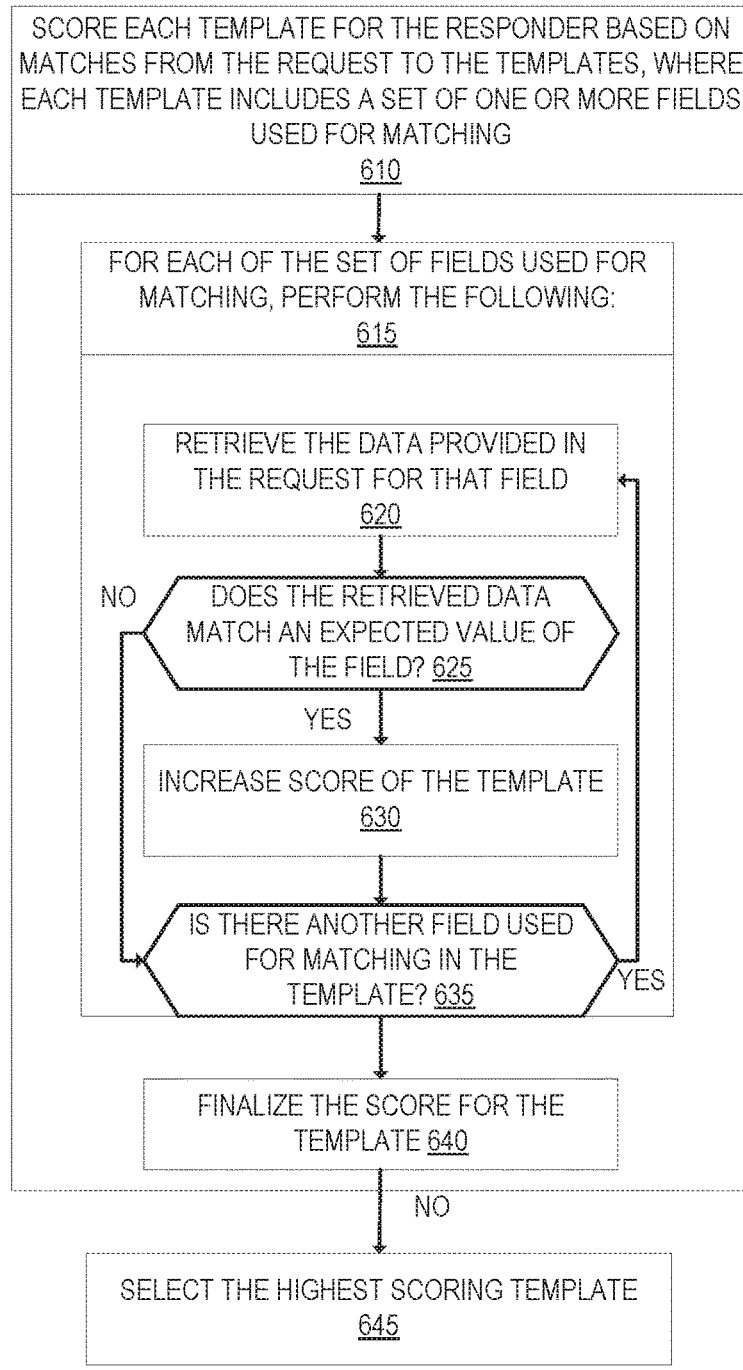
FIG. 6 is a flow diagram that illustrates exemplary operations for selecting a response template from multiple response templates for responding to a request, according to an embodiment.

FIG. 6 is a flow diagram that illustrates exemplary operations for selecting a response template from multiple response templates for responding to a request, according to an embodiment. The operations of FIG. 6 may be performed by the template selector 150 when performing operation 230. At operation 610, the template selector 150 scores each template for the responder based on matches from the request to the templates, where each template includes a set of one or more fields used for matching (referred to as matching preferences). As previously described, each template for a responder includes a set of one or more matching preferences, which may be configurable by that responder. Example operations for scoring each template are described in operations 615-640.

At operation 615, for each of the set of fields used for matching, the operations 620-635 are performed. At operation 620, the data provided in the request for the field is retrieved. Next, at operation 625, a determination is made whether the retrieved data matches an expected value of the field of the template. For instance, the template selector 150 may determine whether the data provided in the request for the field is contained within the matching preference's input value set. If the retrieved data matches an expected value of the field, then flow moves to operation 630 where the template selector 150 increases the score of the template. In an embodiment, the amount the score is increased may be different for different fields, depending on an importance of that field to the responder. For instance, in an embodiment where the request is for a service, one of the fields may be for specifying the occasion for the service, and the responder may have different templates for different occasions. In such a case, the field specifying the occasion may be scored higher than other fields. If the retrieved data does not match an expected value of the field, then flow moves to operation 635, where the template selector 150 determines if there is another field used for matching in the template. If there is, then flow moves back to operation 620, otherwise flow moves to operation 640 where the score for the template is finalized. After each of the templates are scored, flow moves to operation 645 where the template selector 150 selects the highest scoring template.

Figure 7:
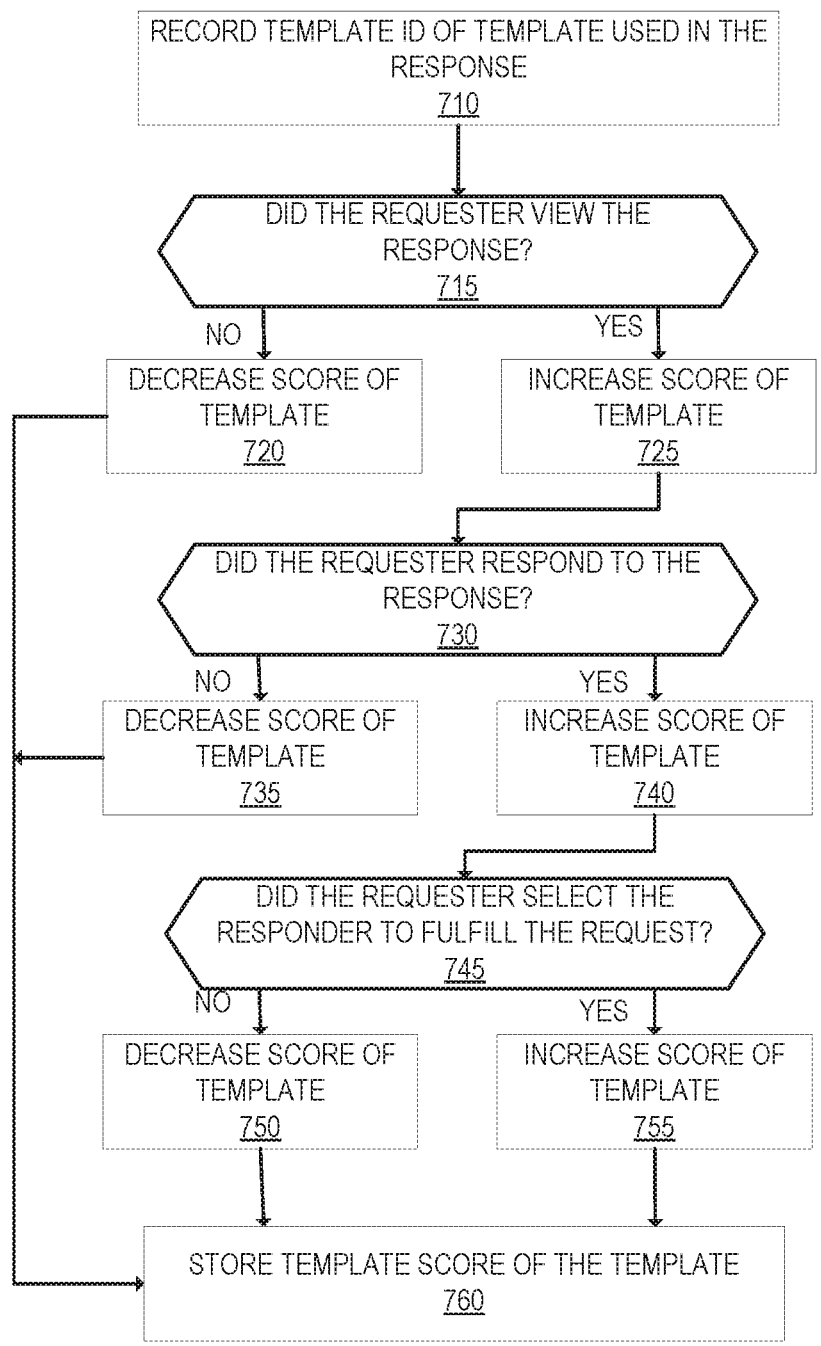
FIG. 7 is a flow diagram that illustrates exemplary operations for calculating the performance of each template of a responder, according to an embodiment.

In an embodiment, the matching process incorporates historical analysis of the templates that reflects how each template performs. FIG. 7 is a flow diagram that illustrates exemplary operations for calculating the performance of each template of a responder, according to an embodiment. The calculated performance may be used when selecting a response template for responding to a request. The operations of FIG. 7 may be performed by the response module 145. The operations of FIG. 7 can be performed in addition to, or in lieu of, the operations described with respect to FIG. 6.

The operations of FIG. 7 are based on information collected by the server 125 after submission of a response by or on behalf of a responder using a template. If no responses have been submitted through use of a template, the operations of FIG. 7 are not performed. In an embodiment, the operations of FIG. 7 are performed only after the number of responses that have been submitted by or on behalf of a responder using a template exceeds a threshold. At operation 710, after submitting a response to a requester that was generated from a template, the response module 145 records an identifier associated to the template used in the response. This identifier is used to identify the template through different interactions with the system. For instance, the server 125 may record in the data store 160 the following information: whether the requester views the response generated by that template (e.g., opens an email link to the response that causes the response to be displayed, opens the response via a native application, and/or logs into an account on the server 125 and opens the response); whether the requester responds to the response (e.g., submits a message to the responder); and/or whether the requester selected the responder to fulfill the request (such as hired the responder).

Flow moves from operation 710 to operation 715, where the response module 145 determines whether the requester viewed the response (e.g., by accessing the information stored in the data store 160). If the requester did not view the response, then flow moves to operation 720 where the score of the template is decreased, and flow moves to operation 745. If the requester viewed the response, then flow moves to operation 725 where the score of the template is increased.

Flow moves from operation 725 to operation 730 where the response module 145 determines whether the requester responded to the response (e.g., by accessing the information stored in the data store 160). If the requester did not respond to the response, then flow moves to operation 735 where the score of the template is decreased and flow moves to operation 745. If the requester responded to the response, then flow moves to operation 740 where the score of the template is increased. The amount that the score is increased in operation 740 may be different than the amount the score is increased in operation 725.

Flow moves from operation 740 to operation 745 where the response module 145 determines whether the requester selected the responder to fulfill the request (such as by hiring the responder) (e.g., by accessing the information stored in the data store 160). If the requester did not select the responder for fulfilling the request, then flow moves to operation 750 where the score of the template is decreased, and flow then moves to operation 745. If the requester selected the responder for fulfilling the request, then flow moves to operation 755 where the score of the template is increased, and flow moves to operation 760, where the score of the template as calculated in operations 715-755 is stored in the data store 160.

The amount that the score is decreased in operations 720, 735, and/or 750, may each be different. The amount that the score is increased in operations 725, 740, and/or 755, may each be different. For instance, selecting the responder to fulfill the request may have the largest increase in the score;

while not responding to the response (although viewing the response) may have the largest decrease in the score. Alternatively, instead of decreasing the score in operations 720, 735, and 750, the response module 145 may keep the score for the template level, and increase the score in operations 725, 740, and 755. As another alternative, instead of increasing the score in operations 725, 740, and 755, the response module 145 may keep the score for the template level, and decrease the score of the template in operations 720, 735, and 750.

The template selector 150 may use the score of the template described in FIGS. 6 and 7 when selecting the template, in operation 230. For instance, the template matching score described in operation FIG. 6 may be combined (e.g., added) with the template performance score in operation FIG. 7 and the highest scoring template may be selected.

Referring back to FIG. 2, sometime after selecting a response template in operation 230, flow moves to operation 235 where the response generator 155 automatically generates a response using the selected template. For instance, the response generator 155 extracts information included in the request corresponding to the set of placeholder values defined for the template and automatically populates the placeholder values with the extracted information. For example, the template may include a placeholder value for the name of the requester, which is included in the request. The response generator 155 extracts the name of the requester from the request and automatically populates the name into the corresponding placeholder value. After generating the response, flow moves to operation 240.

At operation 240, the generated response 180 is transmitted to the requesting requester via the requester device 105. In an embodiment, prior to transmitting the generated response 180, the generated response is provided to the responder for review. The response module 145 may cause a message to be transmitted to the responder (e.g., email, text message, phone call, message within a native application) that indicates that there is a response pending their review. The responder may then adjust the generated response including removing information, adding information, deleting information, and/or selecting a different template for generation of the response. In another embodiment, the generated response is automatically sent to the requesting requester on behalf of the responder without the responder reviewing or otherwise approving the generated response.

As described herein, the improved system for generating responses allows responders to create, manage, and/or configure multiple templates ahead of time for the different types of requests that they might receive. These templates can be automatically selected and a response can be automatically generated using these templates. As a result, the time that is necessary for the responder to respond to the request is greatly diminished. This allows time-sensitive requests to be answered promptly. Further, the generated responses are automatically tailored to fit the request. This allows the responses to be generated automatically without the responder needing to manually adjust the responses, thereby saving time and reducing error of manually reusing a previous response.

The techniques shown in the figures can be implemented using code and data stored and executed on one or more electronic devices (e.g., a requester device, a responder device, and a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server for automatically generating a response to a request received from a first user, comprising:
   receiving configuration information for configuring a plurality of response templates for a second user, wherein the configuration information for each of the plurality of response templates indicates:
      a plurality of matching preferences specifying a plurality of request fields respectively and corresponding sets of one or more expected values, and
      a message body that includes a set of one or more placeholder values;
   generating the plurality of response templates for the second user according to the received configuration information;
   receiving the request from the first user, wherein the request includes a plurality of request values for the plurality of request fields;
   selecting the second user to respond to the request received from the first user;
   automatically selecting one of the plurality of response templates for generating the response to the request received from the first user, wherein the automatically selected one of the plurality of response templates is determined to be the one of the plurality of response templates that most closely matches the request received from the first user, wherein automatically selecting includes:
      for each template, comparing the plurality of request values for the plurality of request fields included in the request with the set of one or more expected values,
      scoring each of the plurality of response templates based at least on the step of comparing, and
      selecting the one of the plurality of response templates that has the highest score;

automatically generating the response using the selected one of the plurality of response templates including populating the set of one or more placeholder values with information extracted from the request received from the first user; and transmitting the generated response to the first user.

2. The method of claim 1, wherein prior to transmitting the generated response to the first user, transmitting the generated response to the second user for approval.

3. The method of claim 1, wherein transmitting the generated response to the first user is performed automatically.

4. The method of claim 1, wherein the request specifies a plurality of parameters, and wherein selecting the second user to respond to the request received from the first user includes determining that the second user meets the plurality of parameters specified in the request.

5. The method of claim 1, wherein scoring each of the plurality of response templates is further based on historical performance of each of the plurality of responses templates.

6. The method of claim 1, wherein selecting the second user to respond to the request received from the first user includes determining that the request specifies the second user for responding to the request.

7. The method of claim 1, wherein the second user is one of a plurality of different users, and wherein selecting the second user to respond to the request includes determining that the second user matches one or more parameters included in the request.

8. A non-transitory machine-readable storage medium that provides instructions that, when executed by a processor in a server, causes said processor to perform operations for generating a response to a request received from a first user, the operations comprising:

receiving configuration information for configuring a plurality of response templates for a second user, wherein the configuration information for each of the plurality of response templates indicates:
a plurality of matching preferences specifying a plurality of request fields respectively and corresponding sets of one or more expected values, and
a message body that includes a set of one or more placeholder values;

generating the plurality of response templates for the second user according to the received configuration information;

receiving the request from the first user, wherein the request includes a plurality of request values for the plurality of request fields;

selecting the second user to respond to the request received from the first user;

automatically selecting one of the plurality of response templates for generating the response to the request received from the first user, wherein the automatically selected one of the plurality of response templates is determined to be the one of the plurality of response templates that most closely matches the request received from the first user, wherein automatically selecting includes:
for each template, comparing the plurality of request values for the plurality of request fields included in the request with the set of one or more expected values,
scoring each of the plurality of response templates based at least on the step of comparing, and
selecting the one of the plurality of response templates that has the highest score;

automatically generating the response using the selected one of the plurality of response templates including populating the set of one or more placeholder values with information extracted from the request received from the first user; and transmitting the generated response to the first user.

9. The non-transitory machine-readable storage medium of claim 8, wherein prior to transmitting the generated response to the first user, transmitting the generated response to the second user for approval.

10. The non-transitory machine-readable storage medium of claim 8, wherein transmitting the generated response to the first user is performed automatically.

11. The non-transitory machine-readable storage medium of claim 8, wherein the request specifies a plurality of parameters, and wherein selecting the second user to respond to the request received from the first user includes determining that the second user meets the plurality of parameters specified in the request.

12. The non-transitory machine-readable storage medium of claim 8, wherein scoring each of the plurality of response templates is further based on historical performance of each of the plurality of responses templates.

13. The non-transitory machine-readable storage medium of claim 8, wherein selecting the second user to respond to the request received from the first user includes determining that the request specifies the second user for responding to the request.

14. The non-transitory machine-readable storage medium of claim 8, wherein the second user is one of a plurality of different users, and wherein selecting the second user to respond to the request includes determining that the second user matches one or more parameters included in the request.

15. A server, comprising:
a processor; and
a non-transitory machine-readable storage medium coupled with the processor and provides instructions that, when executed by the processor, causes said processor to perform operations for generating a response to a request received from a first user including:
receive configuration information for configuration of a plurality of response templates for a second user, wherein the configuration information for each of the plurality of response templates indicates:
a plurality of matching preferences specifying a plurality of request fields respectively and corresponding sets of one or more expected values, and
a message body that includes a set of one or more placeholder values;
generate the plurality of response templates for the second user according to the received configuration information;
receive the request from the first user, wherein the request includes a plurality of request values for the plurality of request fields;
select the second user to respond to the request received from the first user;
automatically select one of the plurality of response templates for generating the response to the request received from the first user, wherein the automatically selected one of the plurality of response templates is determined to be the one of the plurality of response templates that most closely matches the request received from the first user, wherein automatically selection includes:

for each template, compare the plurality of request values for the plurality of request fields included in the request with the set of one or more expected values, score each of the plurality of response templates based at least on the comparison, and select the one of the plurality of response templates that has the highest score;

automatically generate the response using the selected one of the plurality of response templates including an automatic population of the set of one or more placeholder values with information extracted from the request received from the first user; and transmit the generated response to the first user.

16. The server of claim 15, wherein prior to transmission of the generated response to the first user, transmit the generated response to the second user for approval.

17. The server of claim 15, wherein transmission of the generated response to the first user is performed automatically.

18. The server of claim 15, wherein the request specifies a plurality of parameters, and wherein selection of the second user to respond to the request received from the first user includes a determination that the second user meets the plurality of parameters specified in the request.

19. The server of claim 15, wherein the score of each of the plurality of response templates is further based on historical performance of each of the plurality of responses templates.

20. The server of claim 15, wherein selection of the second user to respond to the request received from the first user includes a determination that the request specifies the second user for responding to the request.

21. The server of claim 15, wherein the second user is one of a plurality of different users, and wherein selection of the second user to respond to the request includes determining that the second user matches one or more parameters included in the request.

\* \* \* \* \*